Sept. 20, 1955  J. J. ZIMSKY  2,718,193
MOTOR-PUMP UNIT
Filed March 22, 1952  2 Sheets-Sheet 1

INVENTOR
John J. Zimsky
by Hooper Leonard & Glenn
his attorneys

Sept. 20, 1955         J. J. ZIMSKY                2,718,193
                      MOTOR-PUMP UNIT
Filed March 22, 1952                          2 Sheets-Sheet 2
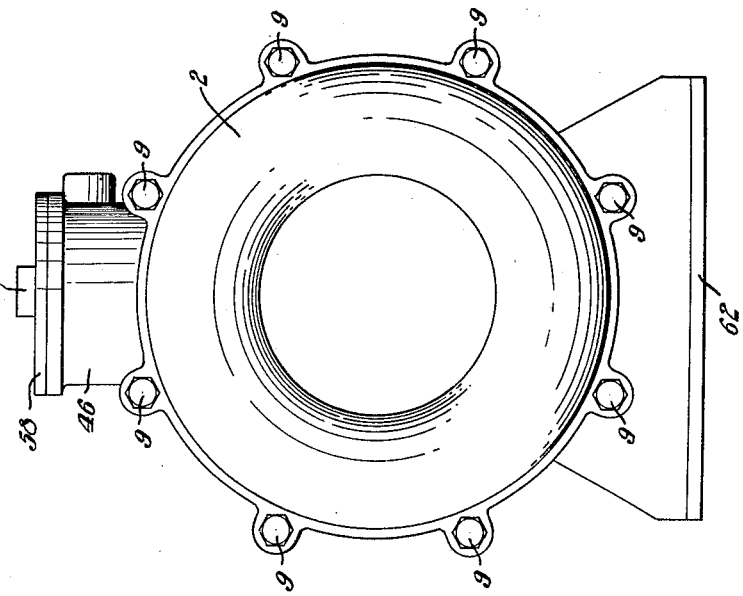
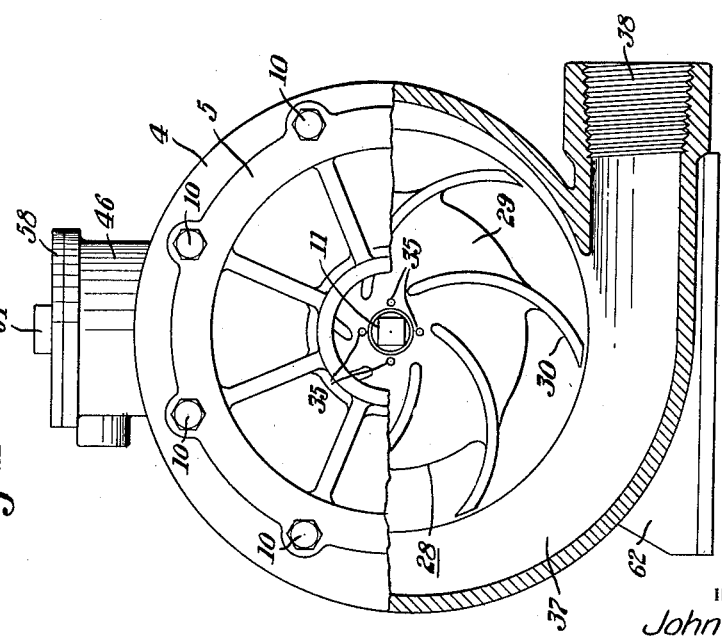
INVENTOR
John J. Zimsky
by Hoopes Leonard & Glynn
his attorneys

United States Patent Office 2,718,193
Patented Sept. 20, 1955

2,718,193

MOTOR-PUMP UNIT

John J. Zimsky, Canonsburg, Pa., assignor, by mesne assignments, to McGraw Electric Company, a corporation of Delaware Application March 22, 1952, Serial No. 277,931

3 Claims. (Cl. 103—87)

This invention relates to a motor-pump unit and particularly such a unit comprising an electric motor with a centrifugal pumping element connected to the motor shaft to be driven thereby. The invention provides certain constructional features whereby important advantages in operation are realized.

I make novel provision for cooling the motor and lubricating the motor bearings by a portion of the fluid being pumped. It is not new broadly to employ a portion of the fluid being pumped for cooling the motor and lubricating the motor bearings but such provisions as have heretofore been made have not been fully satisfactory. I have also made other improvements in the motor-pump unit insuring more satisfactory operation under various operating conditions.

I provide a motor-pump unit comprising a motor having a shaft carrying a rotor, a stator disposed about the rotor, bearings in which the shaft is mounted, a centrifugal pumping element carried by the shaft at one end of the motor, a casing about the centrifugal pumping element and passages at different distances outwardly from the axis of the shaft between the casing and the interior of the motor so that a portion of the fluid being pumped passes from the casing into the motor where it cools the motor and lubricates the motor bearings and then returns to the casing. My motor-pump unit may comprise a casing having a motor compartment and a centrifugal pumping element compartment, bearings in the motor compartment, a shaft mounted in the bearings and extending from the motor compartment into the centrifugal pumping element compartment, a rotor in the motor compartment carried by the shaft, a stator in the motor compartment disposed about the rotor, a centrifugal pumping element in the centrifugal pumping element compartment carried by the shaft and passages within the casing affording communication between the compartments so that a portion of the fluid being pumped passes from the centrifugal pumping element compartment into the motor compartment where it cools and lubricates the bearings and cools the rotor and stator and then returns to the centrifugal pumping element compartment.

In one of its aspects my invention comprises a motor-pump unit comprising a motor casing, a rotatable shaft within the motor casing and projecting from one end thereof, a rotor in the motor casing carried by the shaft, a stator in the motor casing disposed about the rotor, a first bearing in the motor casing for the non-projecting end of the shaft, a second bearing for the projecting end of the shaft, the shaft extending outwardly beyond the second bearing, the second bearing having an inner race and an outer race, means fastening the outer race to the motor casing, a centrifugal pumping element carried by the shaft outwardly of the second bearing, the centrifugal pumping element maintaining in place the inner race of the second bearing, and a casing member connected with the motor casing forming therewith a compartment about the centrifugal pumping element. Such unit is preferably provided with passage means between the compartment and the motor casing through which a portion of the fluid being pumped passes from the compartment into the motor casing where it cools the rotor and stator and lubricates the bearings and then returns to the compartment.

My motor-pump unit employs as above indicated spaced apart bearings for the shaft. Preferably one of the bearings is maintained in fixed position relatively to the motor casing both axially and transversely and the other bearing is maintained in fixed position relatively to the motor casing transversely but is mounted for limited axial movement relatively to the motor casing due to the thermally induced changes in length of the shaft. Preferably the bearing for the non-projecting end of the shaft is disposed in fixed position relatively to the shaft and in fixed position relatively to the motor casing transversely but mounted for limited axial movement relatively to the motor casing due to thermally induced changes in length of the shaft and the bearing for the projecting end of the shaft is disposed in fixed position relatively to the motor casing both axially and transversely. The motor casing may have a guideway for the bearing other than the bearing which is maintained in fixed position relatively to the motor casing both axially and transversely, such guideway maintaining the bearing guided thereby in fixed position relatively to the motor casing transversely but so that it is free for limited axial movement relatively to the motor casing. I preferably provide clamping means for clamping to the motor casing the outer race of one of the shaft bearings and provide a shoulder on the shaft and maintain the inner race of the bearing in position against the shoulder.

I preferably slightly space the centrifugal pumping element from the motor casing to permit a portion of the fluid being pumped to pass therebetween and provide a passage communicating with at least one of the bearings so that such portion of the fluid being pumped can lubricate the bearing.

Other details, objects and advantages of the invention will become apparent as the following description of a present preferred embodiment thereof proceeds.

In the accompanying drawings I have shown a present preferred embodiment of the invention in which:

Figure 2 is a view partly in end elevation of the left hand end of the motor-pump unit and partly in transverse cross section of the motor-pump unit shown in Figure 1; and Figure 3 is an end elevational view of the right hand end of the motor-pump unit viewing Figure 1.

Figure 1:
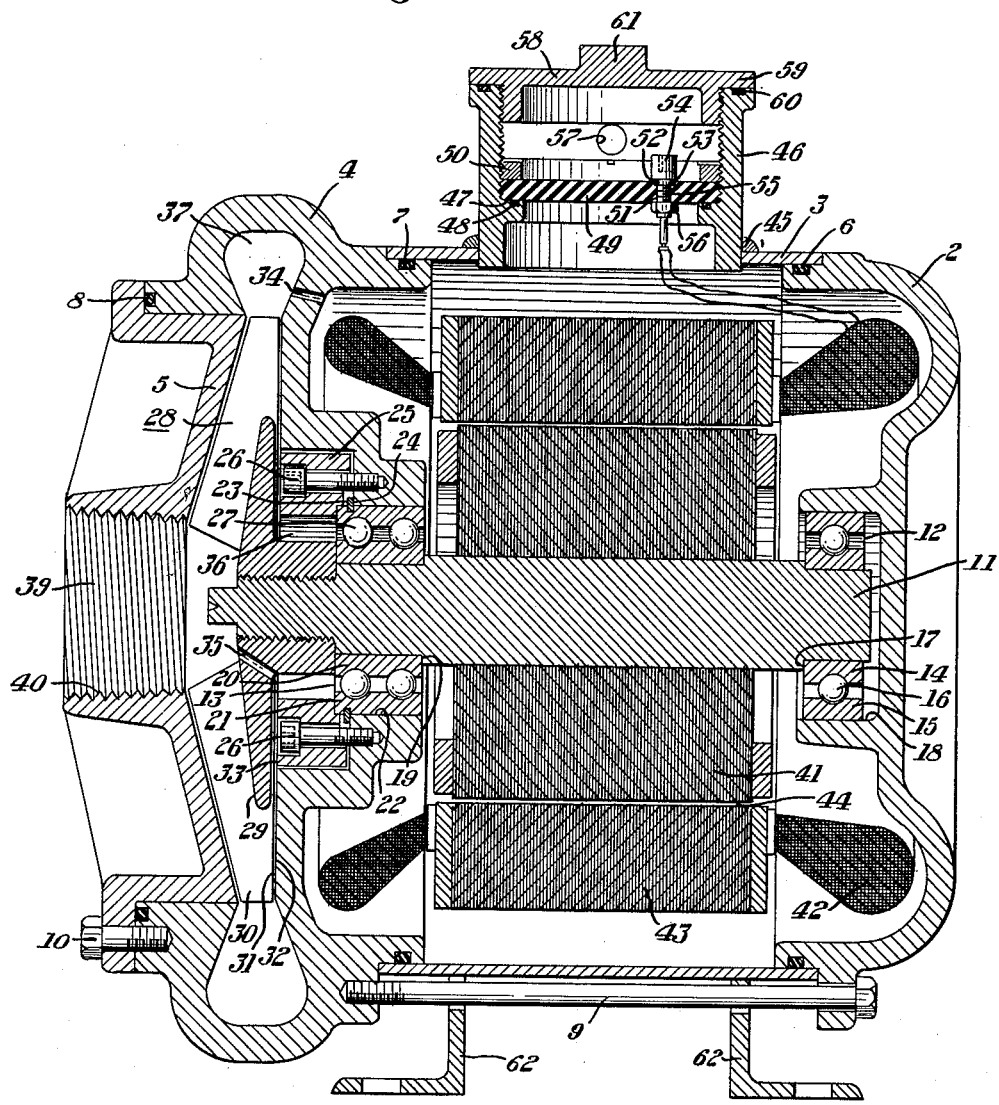
Figure 1 is an axial cross-sectional view through a motor-pump unit.

Referring now more particularly to the drawings, the motor-pump unit comprises cooperating casing members 2, 3, 4 and 5. The casing member 2 forms the right hand end of the motor casing viewing Figure 1, the casing member 3 telescopes over a portion of the casing member 2 as shown in Figure 1 and forms the central generally cylindrical portion of the motor casing and the casing member 4 telescopes within the casing member 3 and forms the left hand portion of the motor casing and defines part of the centrifugal pumping element compartment. The casing member 5 telescopes within a portion of the casing member 4 and cooperates therewith to form the centrifugal pumping element compartment. The casing members 4 and 5 form in effect a casing about the centrifugal pumping element later to be described. The casing members 2 and 3 are sealed together by an O-ring 6, the casing members 3 and 4 are sealed together by an O-ring 7 and the casing members 4 and 5 are sealed together by an O-ring 8. The casing members 2, 3 and 4 are fastened together by bolts 9. The casing members 4 and 5 are fastened together by bolts 10.

The motor-pump unit comprises a shaft 11 mounted in bearings 12 and 13. The left hand end of the shaft viewing Figure 1 extends outwardly beyond the bearing 13 and projects from the motor casing into the centrifugal pumping element compartment or casing. The bearing 12, in which the non-projecting end of the shaft 11 is mounted, has an inner race 14 and an outer race 15 with bearing balls 16 operating between the races in usual manner. The inner race 14 is pressed onto the shaft 11 and seats against a shoulder 17 on the shaft. The casing member 2 is provided with a recess 18 of cylindrical shape coaxial with the shaft 11, the recess 18 forming a guideway for the outer race 15 and hence for the bearing 12. The guideway maintains the bearing 12 in fixed position relatively to the motor casing transversely but so that it is free for limited axial movement relatively to the motor casing due to thermally induced changes in length of the shaft 11.

The shaft 11 has a shoulder 19 against which the inner race 20 of the bearing 13 is positioned. The outer race 21 of the bearing 13 is disposed within a bore 22 in the casing member 4. A circular key or retaining ring 23 is inserted into the outer generally cylindrical surface of the outer race 21 and projects therefrom and bears against the left hand face viewing Figure 1 of the casing member 4 at 24. A holding ring 25 is bolted to the casing member 4 by bolts 26 and bears against the left hand face of the outer race 21 viewing Figure 1 whereby to hold the outer race in place. Bearing balls 27 operate between the inner race 20 and the outer race 21 of the bearing 13 in usual manner.

The centrifugal pumping element is shown at 28 as being of the open type and comprises a hub portion 29 and centrifugal pumping means 30. The hub 29 is internally threaded and is screwed onto the externally threaded left-hand end of the shaft 11 viewing Figure 1. The hub 29 of the centrifugal pumping element 28 maintains the inner race 20 of the bearing 13 in place against the shoulder 19 of the shaft 11. Thus since the inner race 20 of the bearing 13 is fixedly positioned on the shaft 11 and the outer race 21 of the bearing 13 is fixedly positioned with respect to the motor casing the left hand end of the shaft remains in substantially unvarying axial position relatively to the motor casing. Upon thermally induced changes in length of the shaft the bearing 12 moves within the guideway 18 as above described. Thus the unit is free from binding or excessive wear brought about by temperature changes.

The parts are proportioned so that the right hand face 31 of the body portion of the centrifugal pumping element 28 is slightly spaced from the left hand face 32 of the casing member 4 and the left hand face 33 of the holding ring 25 as shown in Figure 1. Also, the holding ring 25 is slightly spaced from the casing member 4 both radially and axially. Further, the holding ring 25 is spaced radially from the hub 29 of the centrifugal pumping element 28. In addition bores 34 are provided in the casing member 4 affording communication between the interior of the motor casing and the interior of the centrifugal pumping element compartment. Similarly bores 35 are provided in the hub 29 of the centrifugal pumping element 28 affording communication between the interior of the centrifugal pumping element compartment or casing and the annular space 36 between the holding ring 25 and the outer peripheral surface of the hub 29, which annular space communicates with the interior of the bearing 13.

The casing member 4 is shaped to provide a volute 37 into which the fluid being centrifugally pumped is delivered, the volute discharging the delivered fluid through an outlet 38. The centrifugal pumping element 28 rotates in the counterclockwise direction viewing Figure 2.

The casing member 5 is provided centrally with an axial inlet 39 through which the fluid being pumped enters the centrifugal pumping element compartment or casing. The inlet 39 is internally threaded as shown at 40 so that a pipe or coupling for introduction of the fluid to be pumped into the motor-pump unit may be screwed thereinto.

Fastened to the shaft 11 centrally of the motor casing is a rotor 41. Carried within the motor casing is a stator having windings 42 and laminations 43 which may be conventional. The stator surrounds the rotor 41 forming a radial fluid gap motor. The gap between the rotor and the stator is designated 44.

Welded to the casing member 3 at 45 is an internally threaded collar 46 having an internal outwardly facing annular seat 47 to which is sealed by an O-ring 48 a disc or panel 49 which may be of insulating material such as Bakelite. The disc 49 is pressed against the seat 47 and the O-ring 48 by a nut 50 which is threaded into the collar 46.

The disc 49 has therethrough a bore 51 having an enlarged upper end 52 to which is sealed by an O-ring 53 a stud 54 having a threaded stem 55 passing through the bore, the stud being held in place by a nut 56. The electrical conductors or leads for operating the motor are brought out through the stud 54, or a plurality of such studs may be provided, one for each lead. The leads may emerge from the collar 46 into a suitable conduit sealed to the collar at an opening 57 therein. The upper end of the collar is closed by a cap 58 threaded thereinto, the cap having an outward radial flange 59 sealed to the upper end of the collar by an O-ring 60. The cap 58 may have a polygonal central upward projection 61 for receiving a wrench.

The unit is thus completely sealed and self-contained and may be employed anywhere, even being submerged in water or other liquid. The O-rings prevent moisture or liquid from either entering or leaving the unit. No stuffing boxes or rotating seals are used anywhere in the structure.

The motor-pump unit may be used for pumping any fluid which has a lubricating and cooling value. Oil is such a fluid and it is contemplated that normally the motor-pump unit herein disclosed will be used for pumping oils such as transformer oil, diesel engine oil, etc.

In operation of the motor-pump unit the fluid to be pumped which will be assumed to be oil enters the centrifugal pumping element compartment from the left viewing Figure 1 through the inlet 39 and is delivered by the centrifugal pumping element 28 to the volute 37 and the outlet 38. A small proportion of the oil passes to the right viewing Figure 1 through the passages 34 into the motor casing where it largely surrounds the rotor and stator as well as the bearings. Oil passes to the left from the bearing 13 through the passages 35 and back into the centrifugal pumping element compartment. Some oil passes between the centrifugal pumping element and the left hand face 32 of the casing member 4 so that a continuous circulation is maintained into the motor casing and back into the centrifugal pumping element compartment. Such circulation lubricates the bearings and cools the motor.

Connected with the casing member 3 are feet 62 through which the motor-pump unit may be fastened in operating position to any suitable supporting structure.

While I have shown and described a present preferred embodiment of the invention it is to be distinctly understood that the invention is not limited thereto but may be otherwise variously embodied within the scope of the following claims.

I claim:

1. A motor-pump unit comprising a motor casing, a rotatable shaft within the motor casing having an end projecting from the motor casing, a rotor in the motor casing carried by the shaft, a stator in the motor casing disposed about the rotor, two bearings in which the shaft is mounted for rotation, the bearings being disposed respectively adjacent the ends of the shaft, the bearing disposed adjacent the first mentioned end of the shaft being mounted in the end of the motor casing and being maintained in fixed position relatively to the motor casing both axially and transversely and the other bearing being maintained in fixed position relatively to the motor casing transversely but being mounted for limited axial movement relatively to the motor casing due to thermally induced changes in length of the shaft, a rotary pumping element carried by the first mentioned end of the shaft immediately outside said end of the motor casing and a casing member connected with the motor casing forming therewith a compartment about the centrifugal pumping element.

2. A motor-pump unit comprising a motor casing, a rotatable shaft within the motor casing having an end projecting from the motor casing, a rotor in the motor casing carried by the shaft, a stator in the motor casing disposed about the rotor, two bearings in which the shaft is mounted for rotation, the bearings being disposed respectively adjacent the ends of the shaft, the bearing disposed adjacent the first mentioned end of the shaft being mounted in the end of the motor casing and being maintained in fixed position relatively to the motor casing both axially and transversely and the other bearing being maintained in fixed position relatively to the motor casing transversely but being mounted for limited axial movement relatively to the motor casing due to thermally induced changes in length of the shaft, a centrifugal open type pumping element carried by the first mentioned end of the shaft immediately outside said end of the motor casing and a casing member connected with the motor casing forming therewith a compartment about the centrifugal pumping element.

3. A motor-pump unit comprising a motor casing, a rotatable shaft within the motor casing having an end projecting from the motor casing, a rotor in the motor casing carried by the shaft, a stator in the motor casing disposed about the rotor, two bearings in which the shaft is mounted for rotation, the bearings being disposed respectively adjacent the ends of the shaft, the bearing disposed adjacent the first mentioned end of the shaft having an inner race and an outer race, the outer race being mounted in the end of the motor casing and being maintained in fixed position relatively to the motor casing both axially and transversely, the other bearing being maintained in fixed position relatively to the motor casing transversely but being mounted for limited axial movement relatively to the motor casing due to thermally induced changes in length of the shaft, a rotary pumping element carried by the first mentioned end of the shaft immediately outside said end of the motor casing and engaging and maintaining in place the inner race of the first mentioned bearing, and a casing member connected with the motor casing forming therewith a compartment about the centrifugal pumping element.

References Cited in the file of this patent

UNITED STATES PATENTS

| | | |
|---|---|---|
| 1,066,635 | MacDonald | July 8, 1913 |
| 1,114,727 | Breeze | Oct. 27, 1914 |
| 1,377,326 | Durnford | May 10, 1921 |
| 1,635,047 | Lang | July 5, 1927 |
| 1,736,002 | Frickey et al. | Nov. 19, 1929 |
| 1,991,761 | McHugh | Feb. 19, 1935 |
| 2,032,552 | Seyfried | Mar. 3, 1936 |
| 2,126,383 | Grothe | Aug. 9, 1938 |
| 2,217,746 | Hawley | Oct. 15, 1940 |
| 2,301,063 | McConaghy | Nov. 3, 1942 |
| 2,312,514 | Zimmerer | Mar. 2, 1943 |

FOREIGN PATENTS

| | | |
|---|---|---|
| 139,277 | Great Britain | Mar. 4, 1920 |
| 272,480 | Great Britain | Dec. 8, 1927 |
| 461,342 | Germany | June 21, 1928 |
| 591,835 | Great Britain | Aug. 29, 1948 |